US012614365B2

(12) United States Patent
Obana et al.

(10) Patent No.: US 12,614,365 B2
(45) Date of Patent: Apr. 28, 2026

(54) NORMALIZING INDIVIDUAL DEPTH PERCEPTION FOR VR

(71) Applicant: Sony Interactive Entertainment Inc., Tokyo (JP)

(72) Inventors: Koichi Obana, San Mateo, CA (US); Yuichiro Nakamura, San Mateo, CA (US); Greg Corson, San Mateo, CA (US); Jeff Stafford, San Mateo, CA (US)

(73) Assignee: Sony Interactive Entertainment Inc., Tokyo (JP)

( * ) Notice: Subject to any disclaimer, the term of this patent is extended or adjusted under 35 U.S.C. 154(b) by 217 days.

(21) Appl. No.: 18/498,713

(22) Filed: Oct. 31, 2023

(65) Prior Publication Data

US 2025/0139923 A1     May 1, 2025

(51) Int. Cl.
*G06T 19/20* (2011.01)

(52) U.S. Cl.
CPC ...... *G06T 19/20* (2013.01); *G06T 2219/2004* (2013.01); *G06T 2219/2016* (2013.01)

(58) Field of Classification Search
None
See application file for complete search history.

(56) References Cited

U.S. PATENT DOCUMENTS

| | | | |
|---|---|---|---|
| 8,830,225 B1 | 9/2014 | Karakotsios et al. | |
| 9,886,229 B2 | 2/2018 | Christmas et al. | |
| 10,505,086 B2 | 12/2019 | Hsieh et al. | |
| 10,768,421 B1 * | 9/2020 | Rosenberg | G02B 27/0172 |
| 11,520,217 B1 | 12/2022 | Benedetto | |
| 11,804,162 B2 | 10/2023 | Byun | |
| 12,120,583 B2 | 10/2024 | Christmas et al. | |
| 2002/0027608 A1 | 3/2002 | Johnson et al. | |
| 2004/0085256 A1 | 5/2004 | Hereld et al. | |
| 2005/0094040 A1 | 5/2005 | Wang et al. | |
| 2008/0252586 A1 | 10/2008 | Cheng | |
| 2010/0118006 A1 | 5/2010 | Kimura | |

(Continued)

FOREIGN PATENT DOCUMENTS

| | | |
|---|---|---|
| CN | 106847172 A | 6/2017 |
| CN | 107957010 A | 4/2018 |

(Continued)

OTHER PUBLICATIONS

Wagemakers et al., Interactive Visual Calibration of Volumetric Head-Tracked 3D Displays, CHI '17: Proceedings of the 2017 CHI Conference on Human Factors in Computing Systems pp. 3943-3953 (Year: 2017).*

(Continued)

*Primary Examiner* — Kee M Tung
*Assistant Examiner* — Biao Chen
(74) *Attorney, Agent, or Firm* — Fish & Richardson P.C.

(57) ABSTRACT

Techniques are described for determining a user's unique depth perception in viewing virtual objects in virtual reality (VR) to make the VR experience more accurate and immersive for the user. The user can align a virtual image the user sees with a real-world image behind the virtual image to provide input indicating the user's depth perception. Depth perception parameters can then be determined from that for subsequently rendering VR objects to that user.

17 Claims, 7 Drawing Sheets

(56) References Cited

U.S. PATENT DOCUMENTS

| | | |
|---|---|---|
| 2013/0021390 A1 | 1/2013 | Inada |
| 2015/0061999 A1 | 3/2015 | Kim et al. |
| 2015/0269880 A1 | 9/2015 | Ge et al. |
| 2016/0094840 A1* | 3/2016 | Warner .................... G06T 7/80 |
| | | 348/188 |
| 2016/0162244 A1 | 6/2016 | Christmas et al. |
| 2016/0267684 A1 | 9/2016 | Li et al. |
| 2016/0267685 A1 | 9/2016 | Yang et al. |
| 2017/0242646 A1 | 8/2017 | Lee et al. |
| 2017/0310956 A1 | 10/2017 | Perdices-Gonzalez et al. |
| 2018/0324396 A1 | 11/2018 | Ishikawa et al. |
| 2019/0022539 A1 | 1/2019 | Kamata et al. |
| 2020/0128174 A1 | 4/2020 | Lin et al. |
| 2020/0211440 A1 | 7/2020 | Lee et al. |
| 2020/0225737 A1 | 7/2020 | Limor et al. |
| 2020/0400951 A1 | 12/2020 | Zhang |
| 2022/0317767 A1 | 10/2022 | Zhang et al. |
| 2023/0072188 A1* | 3/2023 | Gibby ....................... G06T 7/85 |
| 2023/0247176 A1 | 8/2023 | Kita |
| 2024/0069503 A1 | 2/2024 | Park et al. |
| 2025/0117077 A1 | 4/2025 | Obana et al. |
| 2025/0123787 A1 | 4/2025 | Obana et al. |
| 2025/0138315 A1 | 5/2025 | Obana et al. |

FOREIGN PATENT DOCUMENTS

| | | |
|---|---|---|
| CN | 111602100 A | 8/2020 |
| JP | H05210166 A | 8/1993 |
| JP | 2024173860 A | 12/2024 |
| WO | WO 2017149254 A1 | 9/2017 |

OTHER PUBLICATIONS

Farard et al., Calibration Methods for Effective Fish Tank VR in Multi-Screen Displays, CHI 2017, May 6-11, 2017, Denver, CO, USA, ACM 978-1-4503-4656-6/17/05. http://dx.doi.org/10.1145/3027063.3052963) (Year: 2017).*

Zhou et al., Automatic Calibration of a Multiple-Projector Spherical Fish Tank VR Display, 2017 IEEE Winter Conference on Applications of Computer Vision (WACV), Santa Rosa, CA, USA, 2017, pp. 1072-1081, doi: 10.1109/WACV.2017.124) (Year: 2017).*

Archive.org screenshot, Amsler grid, Chart 1, https://web.archive.org/web/20220804002026/https://en.wikipedia.org/wiki/Amsler_grid, hereinafter "ARCHIVE_ORG") (Year: 2022).*

International Search Report and Written Opinion in International Appln. No. PCT/US2024/050701, mailed on Jan. 15, 2025, 11 pages.

* cited by examiner

400

410

420

420

400

420

410

420

560

NORMALIZING INDIVIDUAL DEPTH PERCEPTION FOR VR

FIELD

The disclosure below relates to technically inventive, non-routine solutions that are necessarily rooted in computer technology and that produce concrete technical improvements, and more specifically to normalizing individual depth perception for virtual reality (VR) presentations.

BACKGROUND

As understood herein, so-called "fish tank" display assemblies have been provided. Such assemblies render the image on the display coupled to the head position of the observer as if he/she looks into a fish tank. One display may be used for this purpose, or plural flat panel displays arranged in a box-shaped configuration may be used. Either way, the display(s) can be controlled to produce images as if seen in a fish tank, with the user able to physically move around at different angles to inspect different areas of the rendered virtual object. However, it is recognized herein that improvements can be made to these systems to make them more immersive.

SUMMARY

As further understood herein, each person's individual depth perception is different owing to the uniqueness of each person's eyes. For example, the center of projection might be slightly different for different people. Additionally, light that forms on the back of the retina might be different for different people. As another example, each person's blind spot might be different based on where that specific person's optic nerve connects to the back of the eye. Each person's dominant eye can be a factor too.

With the forgoing in mind, present principles recognize that optical eye tracking via a user's pupils does not result in exact-enough eye tracking to accurately render an electronic three-dimensional (3D) image on a fish tank VR display, or even headset VR display, without something looking off to the user.

Accordingly, in one aspect an apparatus includes at least one processor assembly that is configured to present, on a display, an image related to determining a user's depth perception. The at least one processor assembly is also configured to receive user input adjusting the appearance of the image as presented on the display and, based on the user input adjusting the appearance of the image as presented on the display, determine at least one offset for rendering a three-dimensional (3D) object. The at least one processor assembly is also configured to apply the at least one offset to render the 3D object.

In some example implementations, the image may include a virtual grid pattern and the display may be a transparent display that establishes at least part of one wall of four vertical walls of a box. So in a first specific example, the box as viewable through the transparent display may be white with a black grid pattern, while the virtual grid pattern may be white such that input to align the virtual grid pattern with the black grid pattern results in some or all of the black grid pattern disappearing according to the perspective of the user. In another specific example, the box as viewable through the transparent display may instead be black with a white grid pattern, while the virtual grid pattern may be black such that input to align the virtual grid pattern with the white grid pattern results in some or all of the white grid pattern disappearing according to the perspective of the user.

Also in various example implementations, the user input may change a scale of the image as presented on the display, rotate the orientation of the image as presented on the display, and/or shift the virtual position of the image as presented on the display. So here, for example, the at least offset may include an XYZ scale offset, an XZY rotation offset, and/or an XY shift offset.

In certain cases, the 3D object may be rendered on a multi-display assembly that is box-shaped, and the apparatus may even include the multi-display assembly itself. In other cases, the 3D object may be rendered stereoscopically on a head-mounted display (HMD) device configured for virtual reality (VR) presentations, and the apparatus may even include the HMD device.

In another aspect, an apparatus includes at least one computer medium that is not a transitory signal. The computer medium includes instructions executable by at least one processor assembly to present an image on a display, to receive user input adjusting the appearance of the image as presented on the display, and to determine at least one parameter for rendering a virtual three-dimensional (3D) object based on the user input adjusting the appearance of the image as presented on the display.

In one example, the instructions may also be executable to apply the at least one parameter to render the virtual 3D object.

Additionally, in some example implementations the image may include one or more virtual lines, the display may be a transparent display that establishes at least part of a real-world 3D object, and the inside of the real-world 3D object as viewable through the transparent display may have real lines matching the virtual lines for a user to align the real lines with the virtual lines according to the user's individual depth perception.

In still another aspect, a method includes presenting, on a display, an image related to determining a user's depth perception. The method also includes receiving user input adjusting the appearance of the image as presented on the display and, based on the user input adjusting the appearance of the image as presented on the display, determining at least one parameter for rendering a virtual three-dimensional (3D) object. The method also includes rendering the virtual 3D object according to the parameter.

In one specific example, the method may further include identifying at least one aspect related to the user's eyes based on input from a camera distanced from the user, where the input from the camera may be different from the user input. According to this example, prior to receiving the user input, the method may include presenting the image on the display according to an estimated depth perception parameter for the user. The estimated depth perception parameter may be determined based on the identification of the at least one aspect.

The details of the present disclosure, both as to its structure and operation, can be best understood in reference to the accompanying drawings, in which like reference numerals refer to like parts, and in which:

DETAILED DESCRIPTION

Figure 1:
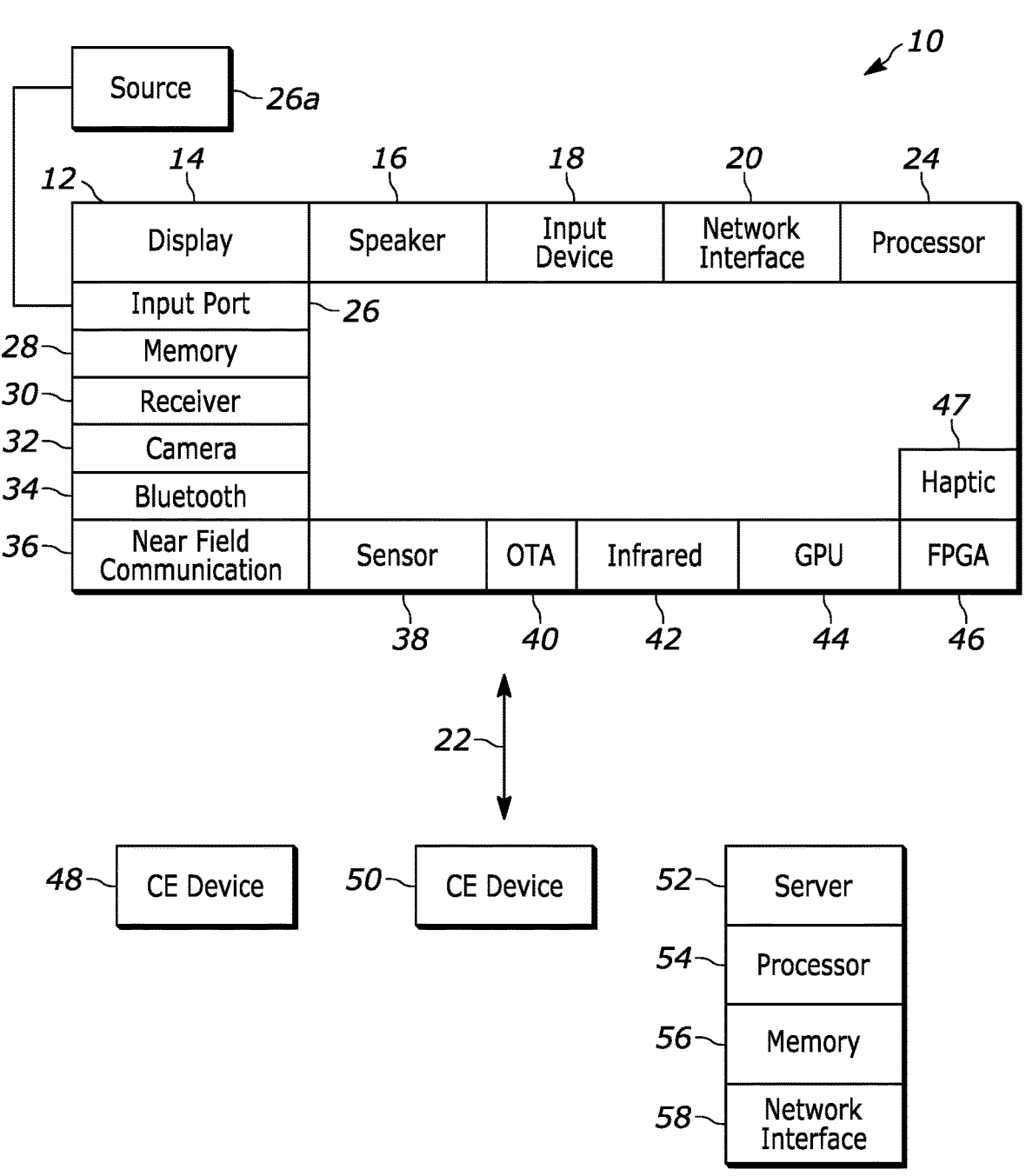
FIG. 1 is a block diagram of an example system consistent with present principles.

This disclosure relates generally to computer ecosystems including aspects of consumer electronics (CE) device networks such as but not limited to computer game networks. A system herein may include server and client components which may be connected over a network such that data may be exchanged between the client and server components. The client components may include one or more computing devices including game consoles such as Sony PlayStation® or a game console made by Microsoft or Nintendo or other manufacturer, extended reality (XR) headsets such as virtual reality (VR) headsets, augmented reality (AR) headsets, portable televisions (e.g., smart TVs, Internet-enabled TVs), portable computers such as laptops and tablet computers, and other mobile devices including smart phones and additional examples discussed below. These client devices may operate with a variety of operating environments. For example, some of the client computers may employ, as examples, Linux operating systems, operating systems from Microsoft, or a Unix operating system, or operating systems produced by Apple, Inc., or Google, or a Berkeley Software Distribution or Berkeley Standard Distribution (BSD) OS including descendants of BSD. These operating environments may be used to execute one or more browsing programs, such as a browser made by Microsoft or Google or Mozilla or other browser program that can access websites hosted by the Internet servers discussed below. Also, an operating environment according to present principles may be used to execute one or more computer game programs.

Servers and/or gateways may be used that may include one or more processors executing instructions that configure the servers to receive and transmit data over a network such as the Internet. Or a client and server can be connected over a local intranet or a virtual private network. A server or controller may be instantiated by a game console such as a Sony PlayStation®, a personal computer, etc.

Information may be exchanged over a network between the clients and servers. To this end and for security, servers and/or clients can include firewalls, load balancers, temporary storages, and proxies, and other network infrastructure for reliability and security. One or more servers may form an apparatus that implement methods of providing a secure community such as an online social website or gamer network to network members.

A processor may be a single- or multi-chip processor that can execute logic by means of various lines such as address lines, data lines, and control lines and registers and shift registers. A processor including a digital signal processor (DSP) may be an embodiment of circuitry. A processor assembly may include one or more processors acting independently or in concert with each other to execute an algorithm, whether those processors are in one device or more than one device.

Components included in one embodiment can be used in other embodiments in any appropriate combination. For example, any of the various components described herein and/or depicted in the Figures may be combined, interchanged, or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together.

Referring now to FIG. 1, an example system 10 is shown, which may include one or more of the example devices mentioned above and described further below in accordance with present principles. The first of the example devices included in the system 10 is a consumer electronics (CE) device such as an audio video device (AVD) 12 such as but not limited to a theater display system which may be projector-based, or an Internet-enabled TV with a TV tuner (equivalently, set top box controlling a TV). The AVD 12 alternatively may also be a computerized Internet enabled ("smart") telephone, a tablet computer, a notebook computer, a head-mounted device (HMD) and/or headset such as smart glasses or a VR headset, another wearable computerized device, a computerized Internet-enabled music player, computerized Internet-enabled headphones, a computerized Internet-enabled implantable device such as an implantable skin device, etc. Regardless, it is to be understood that the AVD 12 is configured to undertake present principles (e.g., communicate with other CE devices to undertake present principles, execute the logic described herein, and perform any other functions and/or operations described herein).

Accordingly, to undertake such principles the AVD 12 can be established by some, or all of the components shown. For example, the AVD 12 can include one or more touch-enabled displays 14 that may be implemented by a high definition or ultra-high definition "4K" or higher flat screen. The touch-enabled display(s) 14 may include, for example, a capacitive or resistive touch sensing layer with a grid of electrodes for touch sensing consistent with present principles.

The AVD 12 may also include one or more speakers 16 for outputting audio in accordance with present principles, and at least one additional input device 18 such as an audio receiver/microphone for entering audible commands to the AVD 12 to control the AVD 12. The example AVD 12 may also include one or more network interfaces 20 for communication over at least one network 22 such as the Internet, an WAN, an LAN, etc. under control of one or more processors 24. Thus, the interface 20 may be, without limitation, a Wi-Fi transceiver, which is an example of a wireless computer network interface, such as but not limited to a mesh network transceiver. It is to be understood that the processor 24 controls the AVD 12 to undertake present principles, including the other elements of the AVD 12 described herein such as controlling the display 14 to present images thereon and receiving input therefrom. Furthermore, note the network interface 20 may be a wired or wireless modem or router, or other appropriate interface such as a wireless telephony transceiver, or Wi-Fi transceiver as mentioned above, etc.

In addition to the foregoing, the AVD 12 may also include one or more input and/or output ports 26 such as a high-definition multimedia interface (HDMI) port or a universal serial bus (USB) port to physically connect to another CE device and/or a headphone port to connect headphones to the AVD 12 for presentation of audio from the AVD 12 to a user through the headphones. For example, the input port 26 may be connected via wire or wirelessly to a cable or satellite source 26a of audio video content. Thus, the source 26a may be a separate or integrated set top box, or a satellite receiver. Or the source 26a may be a game console or disk player containing content. The source 26a when implemented as a game console may include some or all of the components described below in relation to the CE device 48.

The AVD 12 may further include one or more computer memories/computer-readable storage media 28 such as disk-based or solid-state storage that are not transitory signals, in some cases embodied in the chassis of the AVD as stand-alone devices or as a personal video recording device (PVR) or video disk player either internal or external to the chassis of the AVD for playing back AV programs or as removable memory media or the below-described server. Also, in some embodiments, the AVD 12 can include a position or location receiver such as but not limited to a cellphone receiver, GPS receiver and/or altimeter 30 that is configured to receive geographic position information from a satellite or cellphone base station and provide the information to the processor 24 and/or determine an altitude at which the AVD 12 is disposed in conjunction with the processor 24.

Continuing the description of the AVD 12, in some embodiments the AVD 12 may include one or more cameras 32 that may be a thermal imaging camera, a digital camera such as a webcam, an IR sensor, an event-based sensor, and/or a camera integrated into the AVD 12 and controllable by the processor 24 to gather pictures/images and/or video in accordance with present principles. Also included on the AVD 12 may be a Bluetooth® transceiver 34 and other Near Field Communication (NFC) element 36 for communication with other devices using Bluetooth and/or NFC technology, respectively. An example NFC element can be a radio frequency identification (RFID) element.

Further still, the AVD 12 may include one or more auxiliary sensors 38 that provide input to the processor 24. For example, one or more of the auxiliary sensors 38 may include one or more pressure sensors forming a layer of the touch-enabled display 14 itself and may be, without limitation, piezoelectric pressure sensors, capacitive pressure sensors, piezoresistive strain gauges, optical pressure sensors, electromagnetic pressure sensors, etc. Other sensor examples include a pressure sensor, a motion sensor such as an accelerometer, gyroscope, cyclometer, or a magnetic sensor, an infrared (IR) sensor, an optical sensor, a speed and/or cadence sensor, an event-based sensor, a gesture sensor (e.g., for sensing gesture command). The sensor 38 thus may be implemented by one or more motion sensors, such as individual accelerometers, gyroscopes, and magnetometers and/or an inertial measurement unit (IMU) that typically includes a combination of accelerometers, gyroscopes, and magnetometers to determine the location and orientation of the AVD 12 in three dimension or by an event-based sensors such as event detection sensors (EDS). An EDS consistent with the present disclosure provides an output that indicates a change in light intensity sensed by at least one pixel of a light sensing array. For example, if the light sensed by a pixel is decreasing, the output of the EDS may be −1; if it is increasing, the output of the EDS may be a +1. No change in light intensity below a certain threshold may be indicated by an output binary signal of 0.

The AVD 12 may also include an over-the-air TV broadcast port 40 for receiving OTA TV broadcasts providing input to the processor 24. In addition to the foregoing, it is noted that the AVD 12 may also include an infrared (IR)

transmitter and/or IR receiver and/or IR transceiver 42 such as an IR data association (IRDA) device. A battery (not shown) may be provided for powering the AVD 12, as may be a kinetic energy harvester that may turn kinetic energy into power to charge the battery and/or power the AVD 12. A graphics processing unit (GPU) 44 and field programmable gated array 46 also may be included. One or more haptics/vibration generators 47 may be provided for generating tactile signals that can be sensed by a person holding or in contact with the device. The haptics generators 47 may thus vibrate all or part of the AVD 12 using an electric motor connected to an off-center and/or off-balanced weight via the motor's rotatable shaft so that the shaft may rotate under control of the motor (which in turn may be controlled by a processor such as the processor 24) to create vibration of various frequencies and/or amplitudes as well as force simulations in various directions.

A light source such as a projector such as an infrared (IR) projector also may be included.

In addition to the AVD 12, the system 10 may include one or more other CE device types. In one example, a first CE device 48 may be a computer game console that can be used to send computer game audio and video to the AVD 12 via commands sent directly to the AVD 12 and/or through the below-described server while a second CE device 50 may include similar components as the first CE device 48. In the example shown, the second CE device 50 may be configured as a computer game controller manipulated by a player or a head-mounted display (HMD) worn by a player. The HMD may include a heads-up transparent or non-transparent display for respectively presenting AR/MR content or VR content (more generally, extended reality (XR) content). The HMD may be configured as a glasses-type display or as a bulkier VR-type display vended by computer game equipment manufacturers.

In the example shown, only two CE devices are shown, it being understood that fewer or greater devices may be used. A device herein may implement some or all of the components shown for the AVD 12. Any of the components shown in the following figures may incorporate some or all of the components shown in the case of the AVD 12.

Now in reference to the afore-mentioned at least one server 52, it includes at least one server processor 54, at least one tangible computer readable storage medium 56 such as disk-based or solid-state storage, and at least one network interface 58 that, under control of the server processor 54, allows for communication with the other illustrated devices over the network 22, and indeed may facilitate communication between servers and client devices in accordance with present principles. Note that the network interface 58 may be, e.g., a wired or wireless modem or router, Wi-Fi transceiver, or other appropriate interface such as, e.g., a wireless telephony transceiver.

Accordingly, in some embodiments the server 52 may be an Internet server or an entire server "farm" and may include and perform "cloud" functions such that the devices of the system 10 may access a "cloud" environment via the server 52 in example embodiments for, e.g., network gaming applications. Or the server 52 may be implemented by one or more game consoles or other computers in the same room as the other devices shown or nearby.

The components shown in the following figures may include some or all of the components shown in herein. Any user interfaces (UI) described herein may be consolidated and/or expanded, and UI elements may be mixed and matched between UIs.

Present principles may employ various machine learning models, including deep learning models. Machine learning models consistent with present principles may use various algorithms trained in ways that include supervised learning, unsupervised learning, semi-supervised learning, reinforcement learning, feature learning, self-learning, and other forms of learning. Examples of such algorithms, which can be implemented by computer circuitry, include one or more neural networks, such as a convolutional neural network (CNN), a recurrent neural network (RNN), and a type of RNN known as a long short-term memory (LSTM) network. Generative pre-trained transformers (GPTT) also may be used. Support vector machines (SVM) and Bayesian networks also may be considered to be examples of machine learning models. In addition to the types of networks set forth above, models herein may be implemented by classifiers.

As understood herein, performing machine learning may therefore involve accessing and then training a model on training data to enable the model to process further data to make inferences. An artificial neural network/artificial intelligence model trained through machine learning may thus include an input layer, an output layer, and multiple hidden layers in between that that are configured and weighted to make inferences about an appropriate output.

Figure 2:
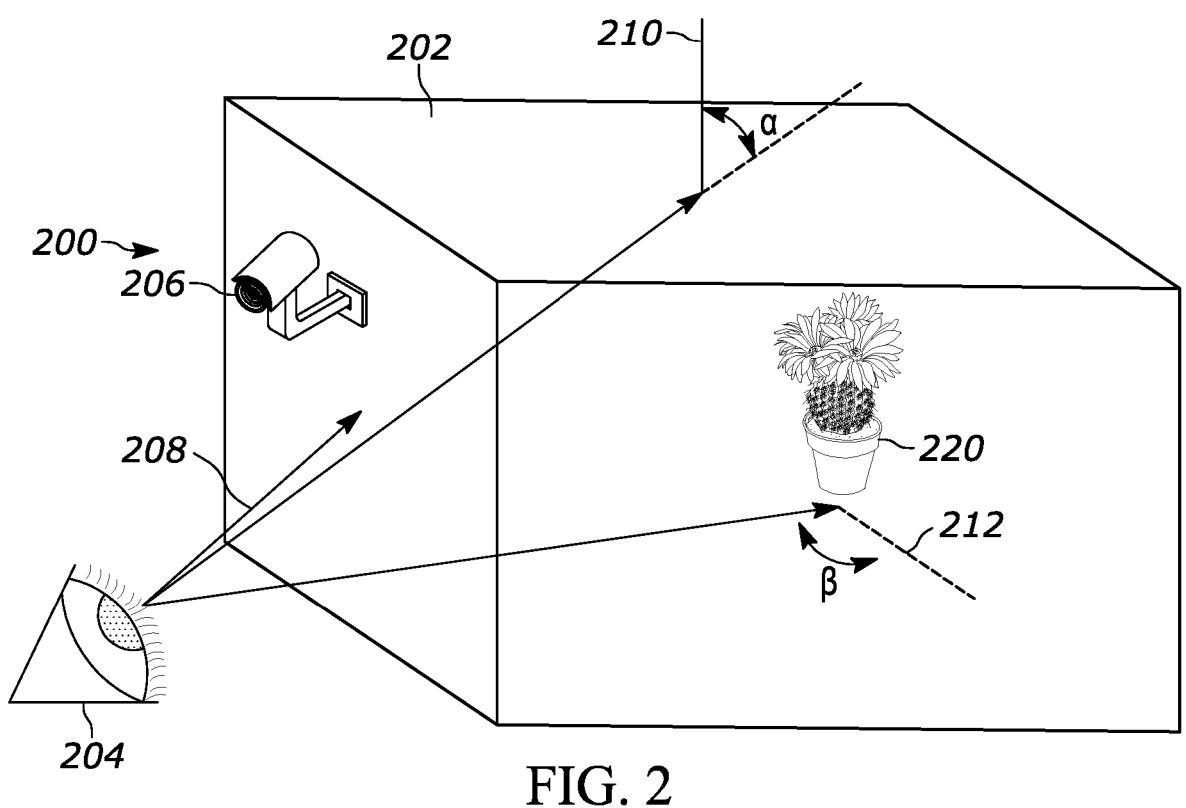
FIG. 2 illustrates an example multi-display assembly.

FIG. 2 illustrates at least one flat panel display 202 that may be a standalone display or part of a multi-display assembly 200 which has plural flat panel displays 202. In the example shown, the display assembly is parallelepiped-shaped/box-shaped, and thus has four side displays and one top display arranged on an open or solid base, to resemble a fish tank. Other configurations are contemplated. The displays 202 may be flat panel displays such as liquid crystal displays (LCD) or light emitting diode (LED) displays or projection displays such as disclosed in commonly-owned U.S. Pat. No. 11,520,217, incorporated herein by reference.

In any case, the location of the user 204 relative to the display, and in particular relative to the screen of the assembly closest to the user, may be determined from, e.g., signals from one or more sensors 206 (such as images from one or more cameras or acoustic signals from one or more microphones that may be part of the assembly 200). Then, depending on the angle of view of a user 204 to each display 202 (which may include angles of view to each pixel or group of pixels of a display) as imaged by one or more cameras 206, one or more three-dimensional (3D) virtual images 220 may be varied to each display to produce a visualization where the user is able to physically move around at different angles to inspect different areas of the rendered image/overall virtual object (which might appear stationary as the user moves) just as the user might view a real-life object in a real-life fish tank by moving around the real-life object within the tank.

Accordingly, the rendering of the one or more images 220 may be varied for each individual display according to the angle of view and according to individualized depth perception metrics for the user 204, which includes varying the images 220 for each individual pixel and/or group of pixels depending on the angle of view to the pixel/group of pixels as well as the depth perception parameters for the user 204. To access the individualized depth perception parameters of the unique user 204, the user 204 themselves may be recognized via facial recognition or other methods for the system to then lookup the user's prestored depth perception parameters (as previously generated and then stored using the processes described in greater detail below).

For disclosure purposes, the angle of view may be expressed herein relative to the surface normal of each display (or pixel or group of pixels). Thus, the angle of view of the user 204 to the closest display 202 is directly along the normal 208 of that closest display, and hence is zero using the convention of the instant disclosure.

In contrast, the angles of view to the top display and right side display of the assembly 200 shown in FIG. 2 are oblique to the surface normal of those displays (and their respective pixels). Thus, the angle of view to the top display relative to its normal 210 forms an oblique angle α with the normal 210, whereas the angle of view to the right side display relative to its normal 212 forms an oblique angle β with the normal 212 which is greater (using the example convention herein) than the angle of view α to the top display.

Figure 3:
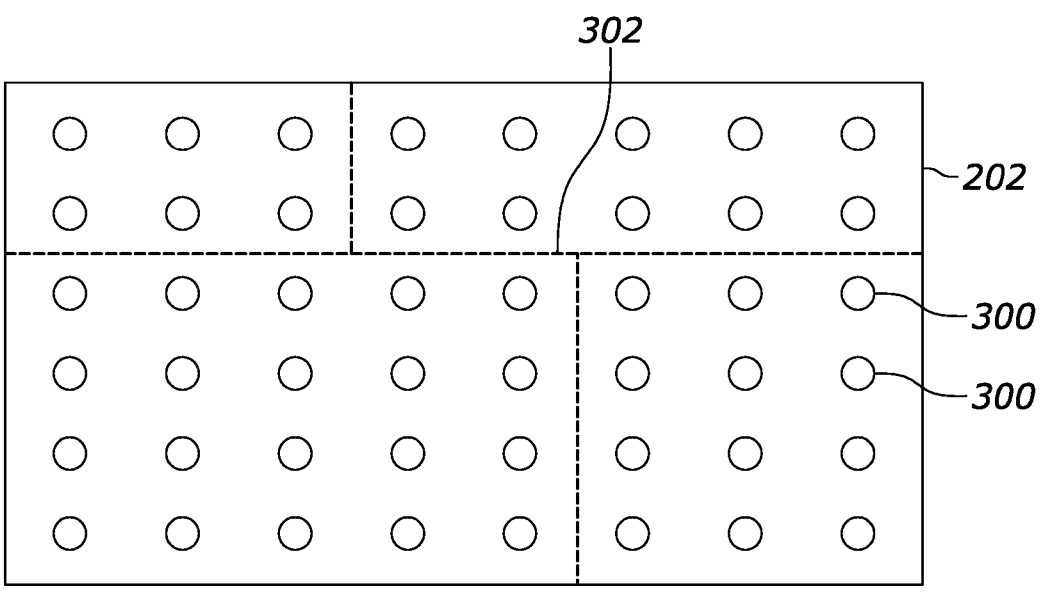
FIG. 3 illustrates schematically the pixels of a display.

FIG. 3 illustrates a display 202 of the assembly 200 which includes plural pixels 300, which may be divided into groups of pixels as illustrated by the dashed lines 302.

Figure 4A:
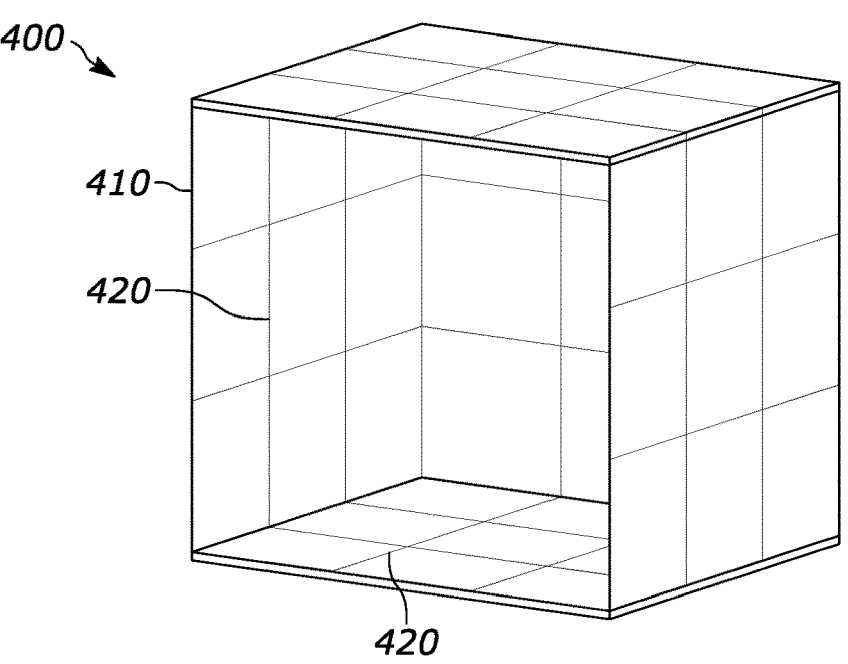
FIGS. 4A and 4B are respective perspective and front elevational views of an example depth perception grid alignment box consistent with present principles.
Figure 4B:
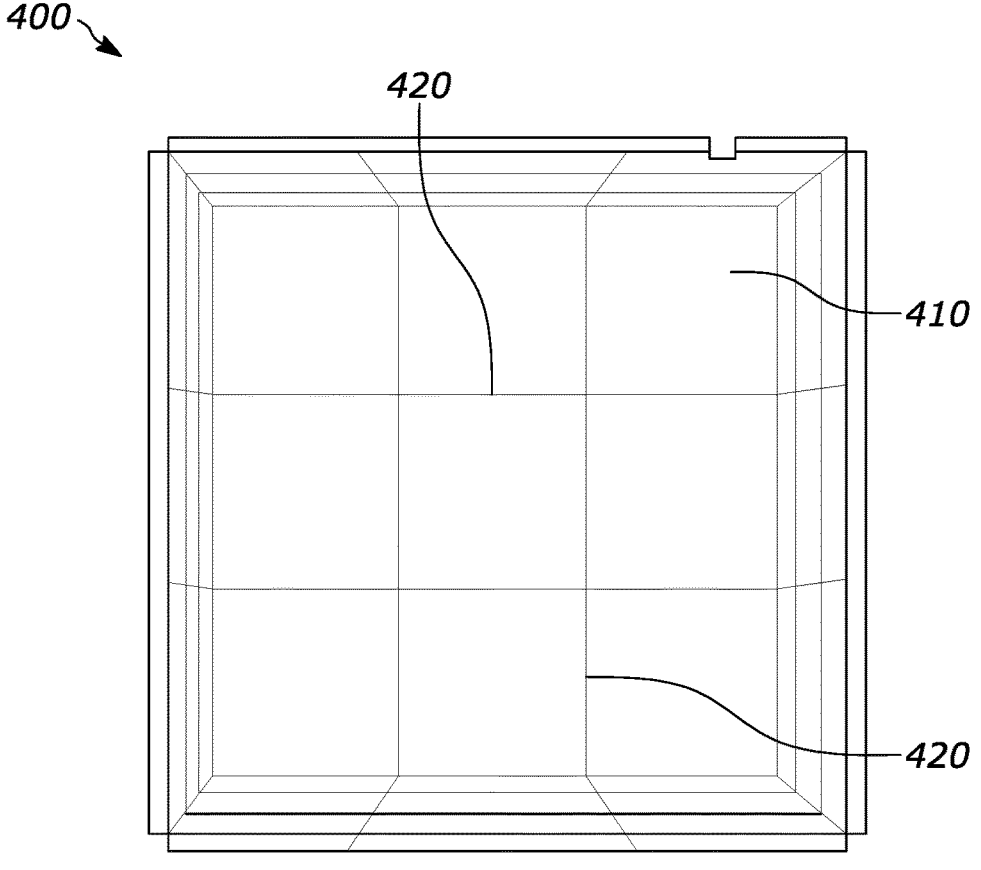

FIGS. 4A and 4B show a tangible, real-world box 400 that may be different from the assembly 200. The box 400 may be used for determining a user's individualized depth perception parameters for use according to the description of FIG. 2 above.

FIG. 4A shows the box 400 in perspective view while FIG. 4B shows the box 400 in front elevational view. The box 400 may be parallelepiped in shape, such as rectangular parallelepiped shape or even cube-shaped in particular. As shown, a front wall/face 410 of the box 400 may be established by a transparent display (such as a transparent LCD display). The face/display 410 may be thought of as an "open" face in that, even when the transparent display establishes the front wall, it remains transparent while other vertical and horizontal walls of the box 400 are solid and opaque.

As also shown in FIGS. 4A and 4B, the inner exposed surfaces of the flat, opaque vertical and horizontal walls may include a real-life black or blue-colored grid pattern 420. The real-life grid pattern 420 may be painted on the inner surfaces, printed on the inner surfaces, taped on the inner surfaces, etc. The pattern 420 may therefore be placed on the inner surfaces of the horizontal top and bottoms walls of the box 400 as well as the vertical back, left, and right side walls of the box 400. Or in other examples, the grid 420 may only be placed on a subset of those walls and/or only partial portions thereof. Either way, the pattern 420 as disposed on each respective inner surface may be at least parallel to if not coplanar with the respective inner surface itself.

It may be appreciated based on FIGS. 4A and 4B that a tester or other user can see the grid(s) 420 using his/her depth perception when the user's head is positioned in front of the display 410 to look into the box 400, owing to the display 410 being transparent. However, present principles recognize that the degree of depth perception varies per person as set forth above.

Therefore, to determine/normalize for individual depth perception for accurate 3D virtual object rendering in VR (where the virtual object appears to be located and even stationary within the real world for the user to move around and inspect it from different angles), a calibration process may be initiated by the system 10 for the user to then provide user input indicating his or her individual depth perception. This is further demonstrated by the example implementation of FIGS. 5A and 5B, where a camera 505 distanced from the user may be used along with computer vision to determine user location and viewing angle/point of view (POV) toward a virtual object rendered on the display 410, similar to how the system 10 would gauge viewing angle when the user views a 3D virtual object presented in the fish tank VR assembly 200. Or user location may already be known/assumed, and viewing angle known/assumed, based on the user placing his/her head within a head stabilization assembly 560 as shown in FIG. 5C. The assembly 560 may therefore be placed or fixed at a preconfigured distance and height in front of the box 400 so that the user's head is stabilized and directed to look directly into the box 400.

Figure 5A:
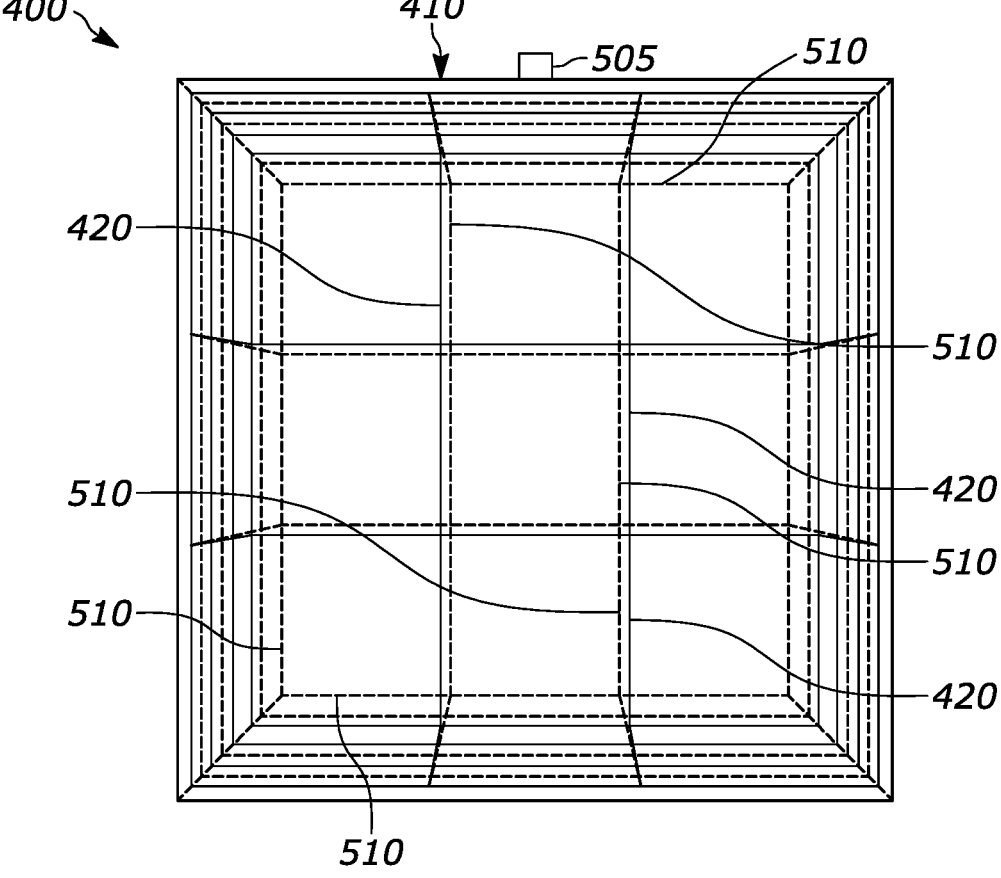
FIGS. 5A and 5B are front elevational views of the box with a transparent display presenting a virtual grid for alignment with a real-world grid in the box consistent with present principles.
Figure 5A:
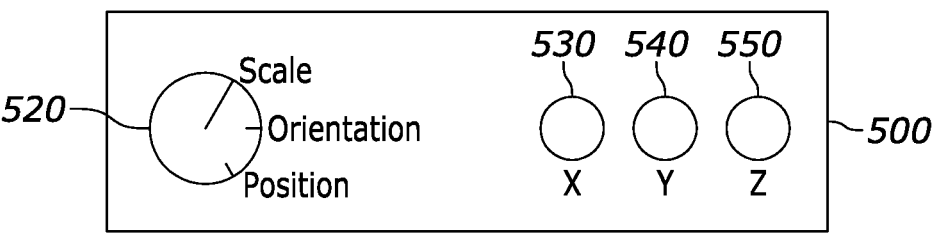
Figure 5B:
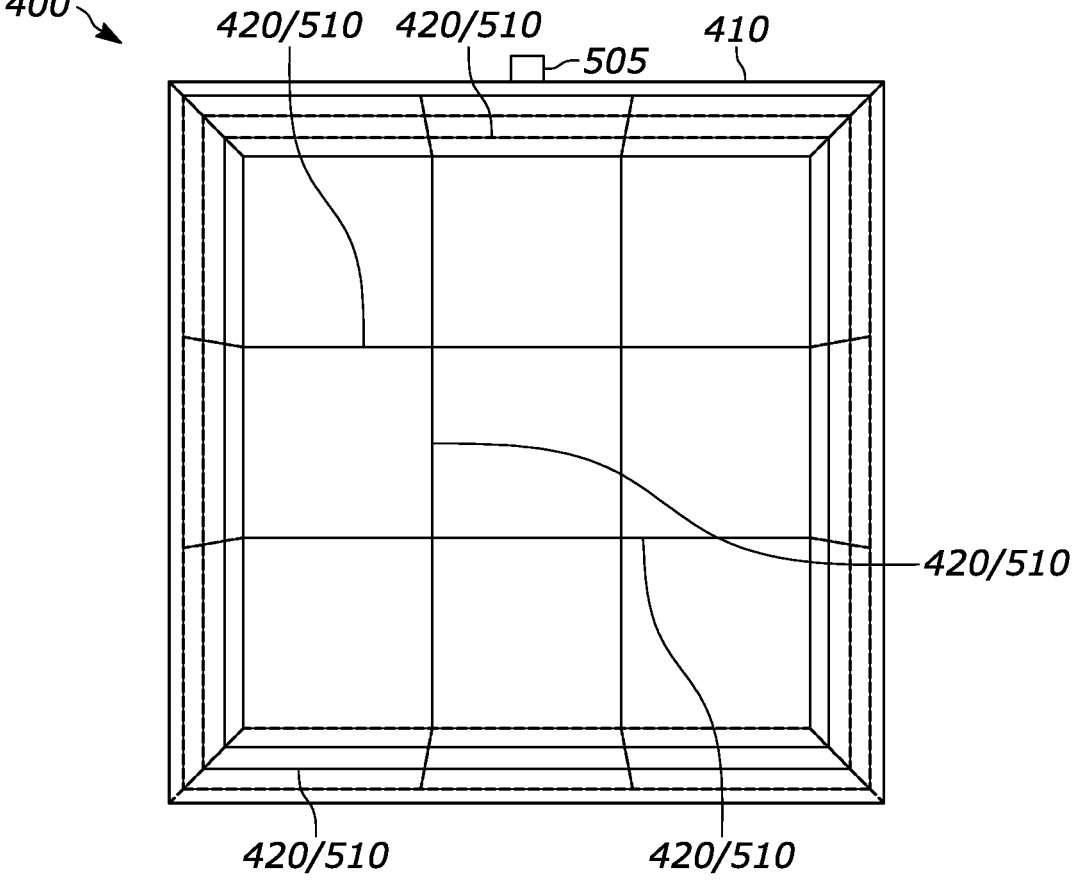
Figure 5B:
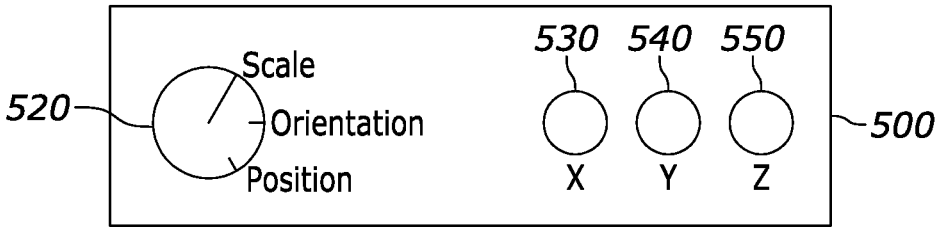
Figure 5C:
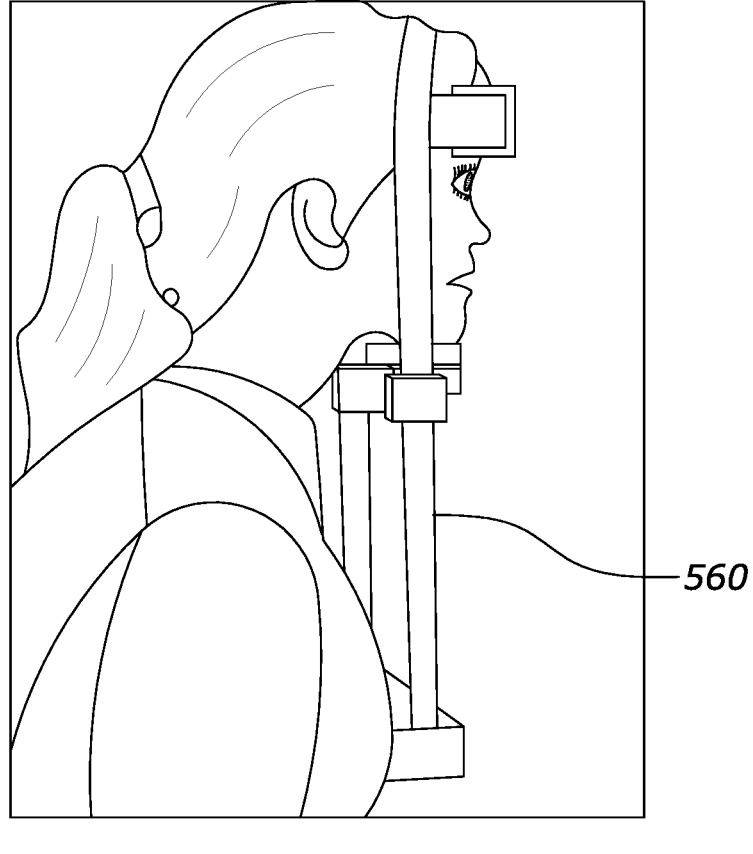
FIG. 5C shows a head stabilization assembly in which the user may place his/her head during grid alignment.

As shown in FIGS. 5A and 5B, a yellow-colored virtual grid 510 or other virtual image may then be projected/presented on the display 410 for the end-user to then adjust the grid 510 so that respective matching portions of the grids 510, 420 are aligned with each other according to the user's own individual depth perception. The user may do so one eye at a time, keeping the opposite eye closed and keeping his/her head in the assembly 560, so that the user can see the grids 420, 510 with one eye from a fixed (and known) location to align the grids 510, 420 according to that individual eye's depth perception. The user may then let the system know alignment is complete (e.g., via voice command) and then repeat the process for the opposite eye. In some specific implementations, the user's binocular parallax may also be verified or determined by doing this procedure for each eye, but with each eye being placed as the same position within real-world 3D space (e.g., the assembly 560 has a single eye hole at a known, fixed location and the user moves his/her head to look through that eye hole with each of the left and right eyes at different points in the process).

In any case, assume as illustrated in FIG. 5A that the grids 420 and 510 initially do not align/match according to the user's individualized depth perception for a given eye. To get the grids 420, 510 to align, the user may use controls on a control panel 500. The control panel 500 may be a physical control panel with four respective rotatable and tunable dials as shown, complete with mechanical and electrical components for inputting rotations of the dials into a system such as the system 10. Per this example, the control panel 500 may be electrically and mechanically coupled to the box 400, or may be disposed on a separate wireless controller. The control panel 500 may additionally or alternatively be a virtual control panel presented on a GUI that itself is presented on an electronic display, such as the electronic display of a head-mounted display (HMD) device for VR, a display of a smartphone, or another type of electronic display.

Regardless, as shown in FIG. 5A, the control panel 500 may include a first dial 520 at which the user can set the system to either scale the grid 510 larger or smaller (e.g., zoom in/out), to rotate the orientation of the grid 510, and/or to shift the position of the grid 510. In the present instance, the indicator on the dial 520 indicates that the system is currently set for scaling.

The panel 500 also includes an X dimension dial 530, a Y dimension dial 540, and a Z dimension dial 550. The user may thus scale the grid 510 in the X, Y, and Z dimensions using the respective dials 530-550 while the dial 520 is set to scale mode as shown in FIG. 5A. The user may similarly rotate or position-shift the grid 510 in the X, Y, and Z dimensions using the respective dials 540, 550 after the dial 520 has been rotated to either the orientation mode or position mode, respectively. The visual appearance of the virtual grid 510 may therefore be adjusted until the user perceives the virtual grid 510 as being aligned with/matched to the real-world grid 420 as shown in FIG. 5B. The amounts by which the user adjusted the grid 510 may then be used to create a unique set of distance perception offsets for that user (in essence, identifying the user's depth perception), as compared to an initial, estimated distance perception metric that might have been determined using optical eye tracking as will be set forth in greater detail later.

However, first note that grid alignment may additionally or alternatively be performed by the user using other input methods as well, such as voice command. For example, voice commands may be provided to audibly control the dials 520-550. As another example, audible commands to "scale larger/smaller", "rotate up/down/left/right", and "shift left/right/up/down" may be received at a local microphone and then executed, even without reference to the dials 520-550.

Also note that in specific non-limiting examples, the box 400 as viewable through the transparent display 410 may be white on the inside with black color being used for the grid pattern 420. Here the virtual grid pattern 510 may be white such that input to align the virtual grid pattern 510 with the black grid pattern 420 may result in some or all of the black grid pattern 420 disappearing according to the perspective of the user.

Or as another non-limiting example, the box 400 as viewable through the transparent display may be black on the inside with white color being used for the grid pattern 420. Here the virtual grid pattern 510 may be black such that input to align the virtual grid pattern 510 with the white grid pattern 420 may result in some or all of the white grid pattern 420 disappearing according to the perspective of the user.

It may therefore be appreciated based on either of these two specific examples that the virtual grid pattern 510 substantially or fully blocks the real-life grid pattern 420 from view according to the user's depth perception, providing a way for the user and the system to both know the grid patterns 420, 510 are optimally aligned according to that specific user's depth perception.

Furthermore, it is to be understood that while the grid patterns discussed above may be particularly suited to gauging the unique depth perception of each individual user in terms of scale, orientation, and shift due to the grid patterns' relatively expansive view within the three dimensions of the box 400 as well as the patterns' symmetric nature, other types of real and virtual images may be used in lieu of the grid patterns 420, 510. For example, matching real and virtual 3D images of an animal or other animate object may be used. Other pattern layouts may also be used, such as a grid of triangles or circles, for example. Other types of real/virtual images besides those just disclosed may also be used.

Figure 6:
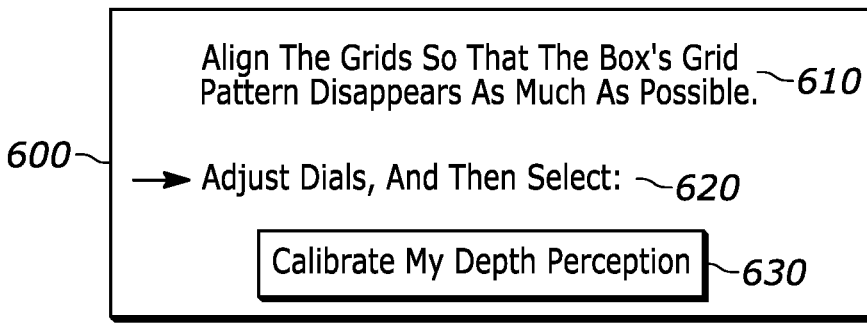
FIG. 6 shows an example graphical user interface (GUI) presentable on a display consistent with present principles.

As another note before moving on to the description of FIG. 6, it is to be understood that in lieu of using the display 410 and assembly 560 at a fixed point directly in front of the box 400, the front face of the box 400 may be left completely open and unobstructed (e.g., no display 410). Per this example, transparent liquid crystal display (LCD) shutter glasses may be used to time-sequentially and stereoscopically render the grid 510 separately to each eye using each lens of the glasses for the user to align the grids 420, 510 with both eyes open (and potentially from a location not directly in front of the box 400). Location and motion tracking may therefore be executed using inertial sensors, cameras, etc. on the glasses themselves to track user location and angle of view to then render the grid 510 to appear within the box 400 for subsequent alignment with the grid 420 as discussed above.

Turning now to FIG. 6, an example graphical user interface (GUI) 600 is shown. The GUI 600 may be presented on a smartphone display, a device that is to present a VR simulation (e.g., fish tank VR assembly or HMD device), a display coupled to the box 400 or even disposed on the control panel 500 specifically, etc. The GUI 600 might therefore be presented, for example, responsive to user login to a VR device, responsive to a first time the user launches a given VR simulation, responsive to user command to identify the user's depth perception, etc.

As shown in FIG. 6, the GUI 600 includes a prompt 610 to align the grids 420, 510 of the box 400 so that the pattern 420 disappears or is minimized as much as possible according to the depth perception and perspective of the user (based on the virtual pattern 510 obstructing the real-life pattern 420 from view once aligned). Another prompt 620 with additional instructions may also be presented. In the present instance, the prompt 620 indicates that the dials 520-550 may be adjusted and then, once the pattern 420 disappears/is minimized as much as possible via controlling the dials 520-550, the selector 630 may be selected. Selection of the selector 630 may therefore command the device to determine and store offsets or other parameters related to the user's depth perception consistent with present principles so that those offsets/parameters may be applied to a 3D rendering of a virtual object on an HMD or fish tank VR-style device at a later time so that the rendering is performed in accordance with the user's own individual depth perception metrics.

Figure 7:
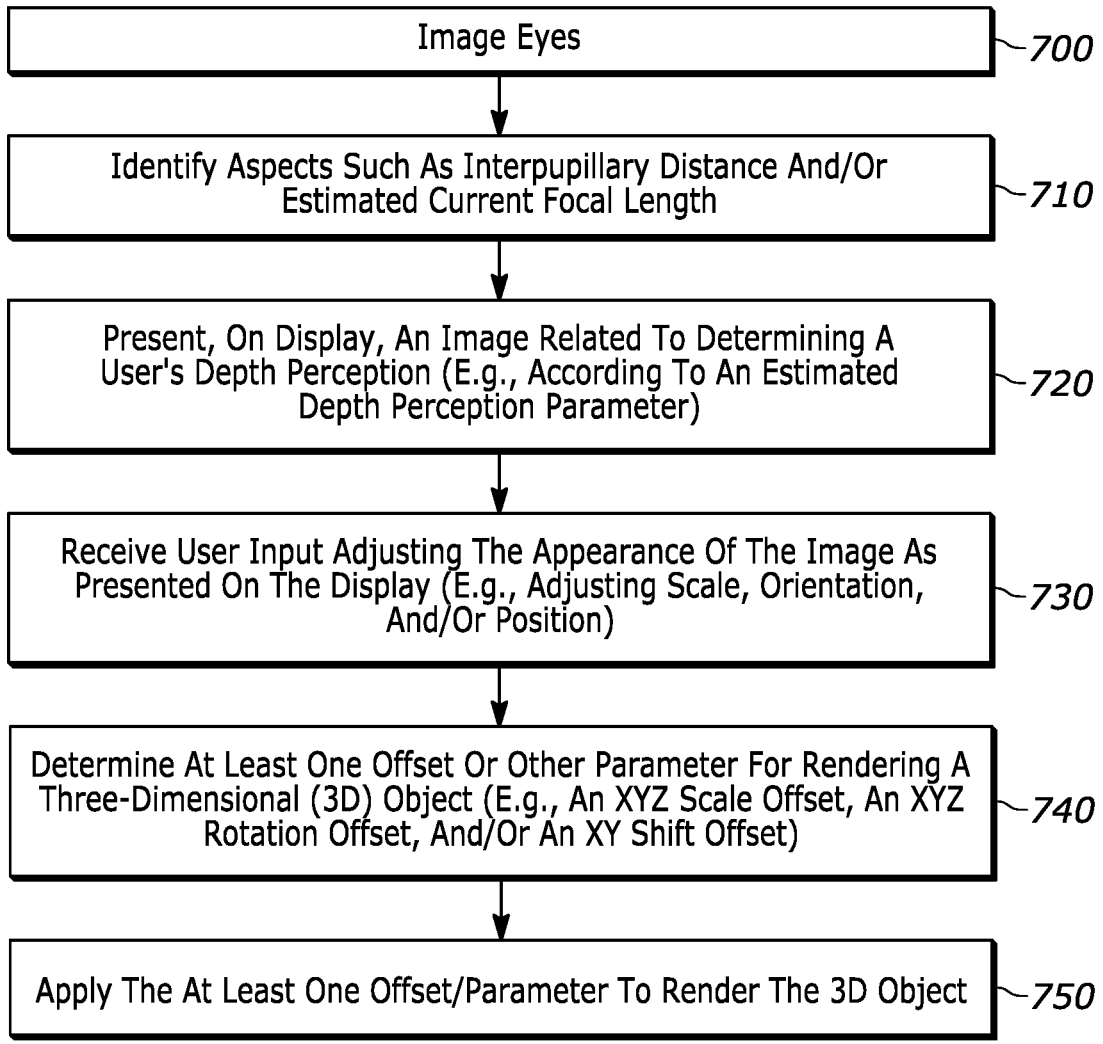
FIG. 7 illustrates example logic in example flow chart format consistent with present principles.

Referring now to FIG. 7, it shows example logic that may be executed by a system such as the system 10, assembly 200, an augmented reality (AR) or VR HMD, a server, and/or any combination thereof consistent with present principles. Note that while the logic of FIG. 7 is shown in flow chart format, other suitable logic may also be used.

Beginning at block 700, the system may image the eyes of an end-user using a camera. For example, the camera 505 may be used (as distanced from the user), as well as a smartphone camera, HMD device camera, etc. From block 700 the logic may then proceed to block 710.

At block 710 the system may execute an optical eye tracking algorithm and/or computer vision to identify one or more aspects related to the user's eyes based on the images from the camera (gathered at block 700. The system may do so to estimate a baseline, albeit inexact, depth perception of the user (e.g., as expressed in one or more estimated depth perception parameters). The system may do so based on a determined parallax of the user as identified from the user's interpupillary distance (IPD), which may be the distance between the X-Y centers of the pupils. Additionally or alternatively, pupil diameter might also be used to estimate a current focal length/depth of focus of the user. Other ways to perform the estimate may also be used.

Executing block 710 can be advantageous so that, at block 720, a virtual image like the grid 510 for determining a user's depth perception may be presented on a display according to the user's estimated depth perception parameters so that the user begins with a rendering that is close to his/her actual depth perception for quick and relatively simple fine-tuning to then be performed consistent with present principles. This not only reduces computer processing time but also allows the user to tweak the virtual image with minor adjustments per his/her depth perception, rather than having to drastically alter the appearance of the virtual image to align with the real-world image (which could be technologically confusing to some end-users).

Before moving to block 730, note again that real and virtual images other than grids per se may be used consistent with present principles. This includes real and virtual lines more generally that would nonetheless still match each other once aligned, for the user to align the real lines with the virtual lines according to the user's individual depth perception. Real and virtual images of a background scene, a 3D geometric shape, an animate object, etc. may also be used for the user to match their outlines and/or features.

From block 720 the logic may then proceed to block 730. At block 730 the system may receive user input adjusting the appearance of the image as presented on the display. This might include input to one or more of the dials 530-550 or even voice input as also discussed above. Or if the display on which the virtual image is presented is touch-enabled, the user may even direct touch input to the display to scale, reorient, and shift the virtual image to align with the real-world image (e.g., touch to scale, reorient, and/or shift the grid 510 to align with the grid 420 per the user's point of view and depth perception).

From block 730 the logic may then proceed to block 740. At block 740, the system may determine at least one depth perception offset or other parameter for subsequent rendering of different 3D virtual objects on fish tank-style display assemblies, HMDs, and other types of displays. Specifically, the system may determine the offsets/parameters based on the user input received at block 730. Accordingly, since the user input might change the scale of the virtual image as presented on the display, might rotate the orientation of the virtual image as presented on the display, and/or might shift the virtual position of the virtual image as presented on the display, the offsets/other parameters generated based on those inputs may respectively include an XYZ scale offset, an XZY rotation offset, and an XY(Z) shift offset (shift in the Z dimension sometimes already being accounted for via scaling).

The generated offsets may be relative to the user-specific baseline parameters that were identified at block 710, or may be absolute offsets from a default, user-agnostic rendering scheme that might be used. At block 740 the system may therefore change current/default projection matrix that is to be used for virtual image rendering according to the generated (user-specific) offsets, thus normalizing for individual depth perception of VR content by allowing translation of 3D coordinates into two-dimensional (2D) coordinates for rendering on a display according to the user's own unique depth perception.

From block 740 the logic may then proceed to block 750. At block 750 the system may apply the offset(s)/parameter(s) to render subsequent 3D objects in VR, AR, or another type of mixed reality (MR) implementation. For example, at block 750 the system may use the parameters to render HMD VR content stereoscopically, to render HMD AR content stereoscopically, or to render fish tank VR content according to the user's own unique depth perception (and angle of view) so that the virtual images look as lifelike as possible. As another example, AR or VR content might be rendered on a smartphone display or other type of display according to the user's individual depth perception parameters as well.

While particular techniques are herein shown and described in detail, it is to be understood that the subject matter which is encompassed by the present application is limited only by the claims.

What is claimed is:

1. An apparatus comprising:

at least one processor configured to perform operations comprising:

presenting, on a display, an image related to determining a user's depth perception;

receiving a user input adjusting an appearance of the image as presented on the display, wherein the user input comprises changing a scale of the image as presented on the display, rotating an orientation of the image as presented on the display, or shifting a virtual position of the image as presented on the display;

based on the user input adjusting the appearance of the image as presented on the display, determining at least one offset for rendering a three-dimensional (3D) object; and applying the at least one offset to render the 3D object.

2. The apparatus of claim 1, wherein the image comprises a virtual grid pattern.

3. The apparatus of claim 2, wherein the display is a transparent display that establishes at least part of one wall of four vertical walls of a box.

4. The apparatus of claim 3, wherein the box as viewable through the transparent display is white with a black grid pattern.

5. The apparatus of claim 4, wherein the virtual grid pattern is white such that input to align the virtual grid pattern with the black grid pattern results in some or all of the black grid pattern disappearing according to a perspective of the user.

6. The apparatus of claim 3, wherein the box as viewable through the transparent display is black with a white grid pattern.

7. The apparatus of claim 6, wherein the virtual grid pattern is black such that input to align the virtual grid pattern with the white grid pattern results in some or all of the white grid pattern disappearing according to a perspective of the user.

8. The apparatus of claim 1, wherein the at least offset comprises an XYZ scale offset, an XZY rotation offset, and an XY shift offset.

9. The apparatus of claim 1, wherein the 3D object is rendered on a multi-display assembly that is box-shaped.

10. The apparatus of claim 9, comprising the multi-display assembly.

11. The apparatus of claim 1, wherein the 3D object is rendered stereoscopically on a head-mounted display (HMD) device configured for virtual reality (VR) presentations.

12. The apparatus of claim 11, comprising the HMD device.

13. An apparatus comprising:

at least one non-transitory computer medium storing instructions executable by at least one processor to perform operations comprising:

presenting, on a display, an image;

receiving a user input adjusting an appearance of the image as presented on the display, wherein the user input comprises changing a scale of the image as presented on the display, rotating an orientation of the image as presented on the display, or shifting a virtual position of the image as presented on the display; and based on the user input adjusting the appearance of the image as presented on the display, determining at least one parameter for rendering a virtual three-dimensional (3D) object.

14. The apparatus of claim 13, the operations further comprising applying the at least one parameter to render the virtual 3D object.

15. The apparatus of claim 13, wherein the image comprises one or more virtual lines, wherein the display is a transparent display that establishes at least part of a real-world 3D object, and wherein an inside of the real-world 3D object as viewable through the transparent display has real lines matching the virtual lines for a user to align the real lines with the virtual lines according to the user's individual depth perception.

16. A method, comprising:

presenting, on a display, an image related to determining a user's depth perception;

receiving a user input adjusting an appearance of the image as presented on the display, wherein the user input comprises changing a scale of the image as presented on the display, rotating an orientation of the image as presented on the display, or shifting a virtual position of the image as presented on the display;

based on the user input adjusting the appearance of the image as presented on the display, determining at least one parameter for rendering a virtual three-dimensional (3D) object; and rendering the virtual 3D object according to the parameter.

17. The method of claim 16, comprising:

identifying at least one aspect related to the user's eyes based on an input from a camera distanced from the user, the input from the camera being different from the user input; and prior to receiving the user input, presenting the image on the display according to an estimated depth perception parameter for the user, the estimated depth perception parameter determined based on the identification of the at least one aspect.

* * * * *